(12) United States Patent
Saito et al.

(10) Patent No.: US 7,204,658 B2
(45) Date of Patent: Apr. 17, 2007

(54) LIGHT-ACCUMULATING LUMINOUS ROAD MARKING MATERIAL AND ROAD STRUCTURE

(75) Inventors: Kenichiro Saito, Chiba (JP); Mieko Sakai, Tokyo (JP); Sumiyo Yamanashi, Tokyo (JP)

(73) Assignee: Availvs Corporation, Tokyo (JP)

( * ) Notice: Subject to any disclaimer, the term of this patent is extended or adjusted under 35 U.S.C. 154(b) by 0 days.

(21) Appl. No.: 10/476,270

(22) PCT Filed: Dec. 27, 2002

(86) PCT No.: PCT/JP02/13818

§ 371 (c)(1),
(2), (4) Date: Jan. 21, 2004

(87) PCT Pub. No.: WO03/057994

PCT Pub. Date: Jul. 17, 2003

(65) Prior Publication Data

US 2004/0146349 A1 Jul. 29, 2004

(30) Foreign Application Priority Data

Dec. 28, 2001 (JP) ............................. 2001-401984

(51) Int. Cl.
*C09K 11/02* (2006.01)
*E01F 9/08* (2006.01)

(52) U.S. Cl. ................ 404/94; 404/14; 252/301.36

(58) Field of Classification Search .............. 404/93, 404/94, 12–17; 252/301.36
See application file for complete search history.

(56) References Cited

U.S. PATENT DOCUMENTS

| | | | | |
|---|---|---|---|---|
| 2,303,463 A | * | 12/1942 | Horne | .................. 106/658 |
| 4,695,336 A | * | 9/1987 | Coburn, Jr. | ................... 156/67 |
| 4,906,523 A | * | 3/1990 | Bilkadi et al. | .............. 428/327 |
| 5,374,465 A | * | 12/1994 | Fulcomer | .................... 428/172 |
| 5,529,615 A | * | 6/1996 | Rendino et al. | ......... 106/31.08 |
| 5,716,723 A | * | 2/1998 | Van Cleef et al. | .......... 428/690 |

(Continued)

FOREIGN PATENT DOCUMENTS

JP    10-1622    1/1998

(Continued)

*Primary Examiner*—Raymond Addie
(74) *Attorney, Agent, or Firm*—Wenderoth, Lind & Ponack, LLP

(57) ABSTRACT

A photoluminescence road marking material which is useful for a marking of a lane of a road, has a high photoluminescence performance along with a required wear resistance and weather resistance, can find an application not only in a white line, but also various types of other color lines by suppressing a green color tone and can further be imparted with a non-slip performance. There is provided the photoluminescence road marking material in which a resin paste containing a transparent resin component and a photoluminescence pigment component is applied on a surface of a road to form a photoluminescence layer, and the resin paste is compounded with from 7% by weight to 95% by weight of the transparent resin component based on the entire weight of the resin paste.

38 Claims, 2 Drawing Sheets

U.S. PATENT DOCUMENTS

| | | | |
|---|---|---|---|
| 5,759,928 A * | 6/1998 | Harper | 442/337 |
| 6,033,146 A * | 3/2000 | Shaw et al. | 404/20 |
| 6,116,814 A * | 9/2000 | Dietrichson | 404/94 |
| 6,207,077 B1 * | 3/2001 | Burnell-Jones | 252/301.36 |
| 6,247,818 B1 * | 6/2001 | Hedblom et al. | 359/540 |
| 6,247,872 B1 * | 6/2001 | Marcato | 404/94 |
| 6,326,053 B1 * | 12/2001 | Stump et al. | 427/163.4 |
| 6,479,132 B2 * | 11/2002 | Hedblom et al. | 428/143 |
| 6,525,111 B1 * | 2/2003 | Spencer et al. | 523/218 |
| 2003/0085384 A1 * | 5/2003 | Burnell-Jones | 252/301.36 |

FOREIGN PATENT DOCUMENTS

| | | |
|---|---|---|
| JP | 10-82023 | 3/1998 |
| JP | 2000-7952 | 1/2000 |
| JP | 2001-3046 | 1/2001 |
| JP | 2001-152420 | 6/2001 |

* cited by examiner

LIGHT-ACCUMULATING LUMINOUS ROAD MARKING MATERIAL AND ROAD STRUCTURE

BACKGROUND OF THE INVENTION

1. Field of the Invention

The present invention relates to photoluminescence road marking materials and road structures. More particularly, the present invention pertains to a novel photoluminescence road marking material which is useful for a marking of a lane of a road and the like, has a high photoluminescence performance and can find an application in a white line, or a color line of, for example, yellow, orange or any other appropriate color by suppressing a green color tone regardless of concurrently using a photoluminescence pigment, and a road structure comprising the novel photoluminescence material.

2. Description of the Related Art

Heretofore, a photoluminescence pigment which absorbs and stores light energy of sunlight or an electric light and, then, emits the energy outside as light has well been known. An application of the pigment for a road marking by making use of excellent characteristics thereof that visual recognition can be obtained at nighttime or in a dark place has been proposed. For example, JP-A-10-82023 proposes a photoluminescence road marking material in which a transparent or semi-transparent light scattering layer is provided on a white or yellow base layer and, further, a transparent or semi-transparent phosphorescent layer containing a phosphorescent pigment is provided on the light scattering layer.

However, the photoluminescence road marking material, which has conventionally been known, has in common a photoluminescence performance effective for a short time period whereby it is difficult to realize visual recognition, which is held over an extended time period. Moreover, the road marking material emits light not only at night but also at daytime by being compounded with the phosphorescent pigment whereby, for example, a color tone of a lane marking applied on a surface of a road is tinted with green; therefore, there has been a problem that the road marking material can not be used for a lane marking of white. Further, there has been a drawback that, when a pigment is compounded into the road marking material for allowing it to be in a color tone of white, yellow, orange or any other appropriate color, a phosphorescent performance is decreased to thereby deteriorate the phosphorescent performance.

Specifically, take, for example, a case of the marking material described in JP-A-10-82023. When a compound which has been recited therein as being preferable was aimed to be reproduced, the photoluminescence property was low, and the color was densely tinted with green by the phosphorescent pigment whereupon it is an actual situation that the compound can not be used for a lane marking of white.

Further, in a case of the conventional marking material, though it is applied on a surface of a road, non-slip performance has rarely been paid attention to; hence, prevention of slip which is derived from wetting with water or staining with oil has been a big problem for the road marking material using the photoluminescence performance.

Under these circumstances, it is an object of the present invention to solve such conventional problems as described above and to provide a novel photoluminescence road marking material which is useful for a marking of a lane of a road, has a required wear resistance or weather resistance as well as a high photoluminescence performance and can find an application in not only a white line, but also various types of color lines by suppressing a green color tone and can, further, be imparted with a non-slip performance.

SUMMARY OF THE INVENTION

To achieve the foregoing and other objectives and in accordance with the purpose of the present invention, as a first aspect of the invention, there is provided a photoluminescence road marking material, being a road marking material in which a resin paste containing a transparent resin component and a photoluminescence pigment component is applied on a surface of a road to form a photoluminescence layer, in which the resin paste is compounded with from 7% by weight to 95% by weight of the transparent resin component based on the entire weight of the resin paste.

As a second aspect of the invention, there is provided the photoluminescence road marking material, in which an average particle diameter of the photoluminescence pigment component is in a range of from 10 µm to 2000 µm.

As a third aspect of the invention, there is provided the photoluminescence road marking material, in which the resin paste comprises the photoluminescence pigment component as well as other pigment components.

As a fourth aspect of the invention, there is provided the photoluminescence road marking material, in which an average particle diameter of the other pigment components is in a range of from 0.1 µm to 40 µm.

As a fifth aspect of the invention, there is provided the photoluminescence road marking material, in which the other pigment components are at least one pigment selected from the group consisting of: a white pigment, a yellow pigment and an orange or a red pigment.

As a sixth aspect of the invention, there is provided the photoluminescence road marking material, in which a compound ratio by weight (B/A) of the photoluminescence pigment component (A) to the other pigment components (B) is 3.0 or less.

As a seventh aspect of the invention, there is provided the photoluminescence road marking material, in which an oxide or a complex oxide of zirconium is compounded as a white pigment component.

As an eighth aspect of the invention, there is provided the photoluminescence road marking material, in which compounding of the oxide or complex oxide of zirconium to the resin paste is in a range of from 0.1% by weight to 5.0% by weight based on the entire weight of the resin paste.

As a ninth aspect of the invention, there is provided the photoluminescence road marking material, in which a viscosity of the transparent resin component is 1 Pa.s (20°) or more.

As a tenth aspect of the invention, there is provided the photoluminescence road marking material, in which a content ratio of air bubbles to a unit volume of the resin paste is 2% or less.

As an eleventh aspect of the invention, there is provided the photoluminescence road marking material, in which the resin paste is prepared by mixing under an atmosphere of a reduced pressure.

Further, as a twelfth aspect of the invention, there is provided the photoluminescence road marking material being any one of the above-described photoluminescence road marking materials, in which the resin paste is compounded with a transparent aggregate.

As a thirteenth aspect of the invention, there is provided the photoluminescence road marking material, in which the transparent aggregate is at least one member selected from the group consisting of: silica rock, fused silica and glass.

As a fourteenth aspect of the invention, there is provided the photoluminescence road marking material, in which the silica rock, the fused silica and the glass have a particle diameter in a range of from 0.3 mm to 10 mm and are compounded in a range of from 0.1 time by weight to 6 times by weight as much as the entire weight of the resin paste.

As a fifteenth aspect of the invention, there is provided the photoluminescence road marking material being any one of the above-described road marking materials, further being applied on the surface of the road.

As a sixteenth aspect of the invention, there is provided the photoluminescence road marking material, being any one of the above-described road marking materials, in which the resin paste is applied on the surface of the road and, before the thus-applied resin paste is cured, the transparent aggregate is scattered to be embedded in the photoluminescence layer in a state in which at least one part of a contour of the transparent aggregate is exposed.

As a seventeenth aspect of the invention, there is provided the photoluminescence road marking material, in which 50% by volume or more of each of such transparent aggregates is embedded.

As an eighteenth aspect of the invention, there is provided the photoluminescence road marking material, in which the transparent aggregate protrudes in a range of from 0.05 mm to 5 mm from a cured surface part of the resin paste.

As a nineteenth aspect of the invention, there is provided the photoluminescence road marking material, in which thickness of the resin paste to be applied is in a range of from 1 mm to 5 mm.

As a twentieth aspect of the invention, there is provided the photoluminescence road marking material, in which the transparent aggregate is at least one member selected from the group consisting of: silica rock, fused silica and glass, a particle diameter thereof is in a range of from 0.3 mm to 10 mm, and a scattering ratio thereof is in a range of from 1 kg/cm$^2$ to 30 kg/cm$^2$.

As a twenty-first aspect of the invention, there is provided a photoluminescence road marking material, being the road marking material in which the transparent aggregate recited in any one of the aspects 12 to 14 is compounded in the resin paste, in which the resin paste is applied to the surface of the road, cured and, thereafter, a surface of the thus-cured resin paste is subjected to rough polishing or a water-jet treatment to remove a cured surface part of the resin paste.

As a twenty-second aspect of the invention, there is provided the photoluminescence road marking material, in which the cured surface part of the resin paste was removed by a range of from 0.1 mm to 2 mm in a thickness direction from the surface thereof.

As a twenty-third aspect of the invention, there is provided a photoluminescence road structure in which any one of the above-described road marking materials is applied on a surface of a road.

As a twenty-fourth aspect of the invention, there is provided the photoluminescence road structure, in which a white undercoat layer is previously applied on the surface of the road on which the road marking material is applied.

As a twenty-fifth aspect of the invention, there is provided the photoluminescence road structure, in which the road marking material is applied on the surface of the road or the white undercoat layer via a primer layer.

As a twenty-sixth aspect of the invention, there is provided the photoluminescence road structure, in which the surface of the road is previously subjected to a surface roughening treatment.

BRIEF DESCRIPTION OF THE DRAWINGS

FIG. 1 is a cross-sectional view illustrating a series of water-jet treatments and the like.

DETAILED DESCRIPTION OF THE INVENTION

Figure 1:
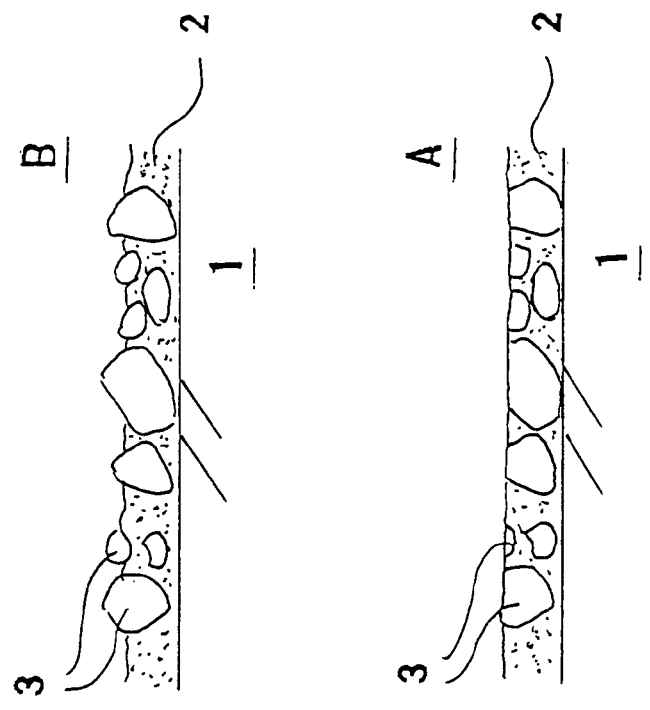
Figure 1:
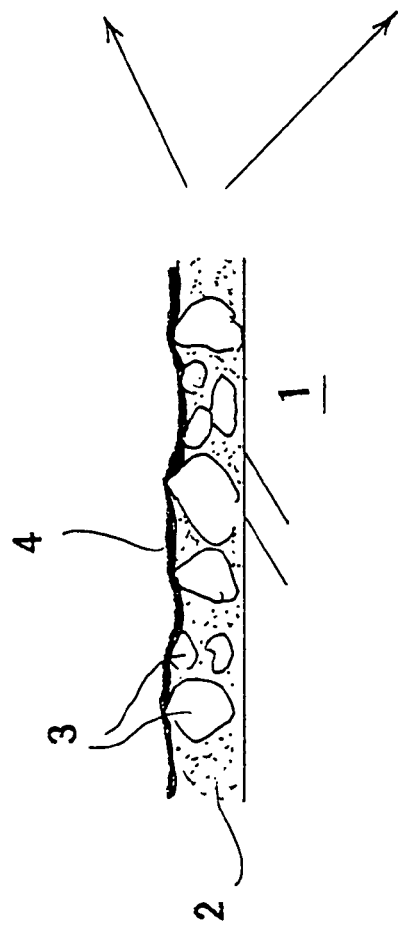

While the present invention has features describe above, referring now to the accompanying drawings, preferred embodiments of the invention are described in detail below.

More than anything else, the invention is characterized by a road marking material which has a high photoluminescence performance and is useful for a lane marking of a road and the like as a white line or any other color line by suppressing a green color tone and, the road marking material on this occasion is basically a road marking material in which a resin paste comprising a transparent resin component as well as a photoluminescence pigment component is applied on a surface of a road to form a photoluminescence layer.

As for the transparent resin component, various types of transparent resin components are permissible, so long as they can form a resin paste, are transparent and can, further, be cured after applied on the surface of the road. Needless to say, they are permissible, so long as they have durability as a lane marking of a road and the like, that is, appropriate strength or hardness such as weather resistance, light resistance, and water resistance. Various types of transparent resin components, for example, a methacrylic resin component, an acrylic resin component, an unsaturated polyester-type resin component, an epoxy resin component, a silicone-type resin component and other appropriate resin components may be illustrated.

The term "transparent" as used in the transparent resin components as well as herein is intended to mean a state of being high in light transmittance and to be tinted with white or any other color tones, so long as they have a high light transmittance. Ordinarily, the transparent resin component having a transmittance of 70% or more, and preferably 85% or more, in terms of ultraviolet ray transmittance, is used.

Since the transparent resin components are used for forming resin paste, those in any state of liquid, viscous and syrup states are permissible. For this end, for example, those in a state in which a polymer and a monomer are mixed with each other are permissible. Namely, they may be in any state of the following states:

(1) a resin (polymer) itself;
(2) a state in which a polymer and a monomer are mixed with each other;
(3) a state in which a polymer and an oligomer are mixed with each other;
(4) a state in which an oligomer and a monomer are mixed with each other; and
(5) a state in which a polymer, an oligomer and a monomer are mixed with one another.

The transparent resin component as a basic component which constitutes the resin paste secures adhesivity of a photoluminescence layer for use in a lane marking and the like on a surface of a road or performs a role as a binder for dispersion of a photoluminescence pigment and the like and, further, after being cured, ensures translucency, water resistance, wear resistance and the like. According to the invention, a quantity of the transparent resin component to be compounded is, being based on the entire weight of the resin paste, from 7% by weight to 95% by weight, and more preferably from 15% by weight to 60% by weight. When the quantity thereof is more than 95% by weight, since a pigment component or a photoluminescence pigment component is not allowed to be sufficiently compounded, a high photoluminescence performance cannot be obtained. When a surface hardness, wear resistance or the like as the marking material on the surface of the road on which automotive vehicles run is taken into consideration, it is preferable from a practical standpoint that the quantity is 60% by weight or less. On the other hand, when the quantity of the transparent resin component to be compounded is excessively low as being less than 7% by weight, when the resin paste is applied on the surface of the road as the lane marking and the like, it becomes difficult to obtain a sufficient adhesive strength, water resistance and the like as the photoluminescence layer. Although varied according to the types of the transparent resin components, when the resin paste is directly applied on a surface of a road base, for example, a surface of concrete or a surface of asphalt, the quantity of the transparent resin is ordinarily 20% by weight or more, whereas, when applied via a primer layer, it is preferably 15% by weight or more. More practically, in a case of a direct application, in order to have a required high density, a favorable adhesive strength to the road base or a favorable surface hardness and, further have the wear resistance, the water resistance and the high photoluminescence performance, it is more preferable that the quantity is in a range of from 20% by weight to 40% by weight.

Further, viscosity of the transparent resin component is preferably 1 Pa.s or more (20° C.), and more preferably 3 Pa.s or more (20° C.). By using the transparent resin component having such a relatively high viscosity, it is made possible that the photoluminescence pigment component having a relatively large particle diameter in which a higher photoluminescence performance can be expected is uniformly dispersed whereupon an excellent photoluminescence performance as a road marking material after being cured can be realized.

Not only the type can adjust the viscosity of the transparent resin component thereof but also, for example, by controlling a ratio of a polymer to a monomer in a state of being mixed with each other.

For example, in a case of an MMA resin component, viscosity of a syrup (available from Mitsubishi Rayon Co., Ltd. or the like) in a state in which an MMA polymer and an MMA monomer are mixed with each other can be adjusted as shown in Table 1 in relation to a content ratio of the MMA polymer therein.

TABLE 1

| Viscosity Pa · s (20° C.) | Content ratio (wt %) of MMA polymer |
| --- | --- |
| 1.5 | 25 |
| 2.0 | 27 |
| 3.3 | 29 |
| 5.5 | 31 |
| 10.0 | 33 |
| 14.0 | 35 |

However, when the viscosity is excessively high, it becomes practically difficult to mix the photoluminescence pigment and the like into the resin paste and to perform an operation of or a work of a uniform dispersion. For this reason, as a temporary reference, it is considered that an uppermost limit of the viscosity is set to be about 100 Pa.s (20° C.)

The transparent resin component as described above is mixed with the phosphorescent pigment component to constitute the resin paste. Thus-constituted resin paste may further contain any of the following components:
  other pigment components
  transparent aggregates.

It goes without saying that other components than the above-described components, for example, a curing catalyst, a curing auxiliary agent, a viscosity adjusting agent, an ultraviolet ray deterioration preventive agent, an anti-fungus agent and the like, may optionally be added so long as they do not infringe the purpose and effectiveness of the invention.

It is considered that, as the photoluminescence pigment to be mixed to the transparent resin component, not only known pigments, but also commercially available pigments and various types of other appropriate pigments are put in use. Examples of these pigments include a strontium aluminate-type material and a zinc sulfide-type material. The photoluminescence pigments having an average particle diameter of 10 μm or more are usable. According to the invention, the average diameter thereof is preferably from 20 μm to 2000 μm, and more preferably from 30 μm to 300 μm. Those having a particle diameter of as large as 100 μm or more can also be preferably used.

Heretofore, it has not been easy to use the photoluminescence pigment having such a large particle diameter. This is because that it has been difficult to uniformly disperse the photoluminescence pigment having the large particle diameter.

According to the invention, the photoluminescence pigment having a relatively large particle diameter which has conventionally been difficult to be uniformly dispersed can be uniformly dispersed in the resin paste by using the transparent resin component having such a relative high viscosity as 1 Pa.s or more (20° C.) and, as a result, a uniformly dispersed road marking material is allowed to be realized.

By the fact that the use of the photoluminescence pigment component having a relatively large particle diameter has been made possible, a larger energy is absorbed in the photoluminescence pigment component whereupon retention of the light-emitting performance for an extended time period has been made possible.

A quantity of the photoluminescence pigment component to be compounded is ordinarily preferably 5% by weight or more based on the entire weight of the resin paste. When it is less than 5% by weight, it is difficult to obtain a required sufficient photoluminescence function.

Further, according to the invention, as a temporary reference of the photoluminescence function, it is considered that a time period for retaining a light emission from a saturation state generated by irradiating 200Lx from a D605 normal light source to brightness of 3 mcd/m$^2$ that is a lower limit at which a human individual can visually recognize a contour of a subject is preferably 8 hours or more. From this standpoint, a compounding ratio of the photoluminescence pigment component to the transparent resin component is selected taking into consideration combinations with other components.

Furthermore, in the photoluminescence road marking material according to the invention, other pigment components may optionally be mixed together with the photoluminescence pigment component. A weight ratio (B/A) of the photoluminescence pigment component (A) to other pigment components (B) is ordinarily preferably 3.0 or less. When the ratio is more than 3.0, the other pigment components, most of which are inorganic particles, conceals the photoluminescence pigment component whereby phosphorescence performed by absorbing light from outside and a subsequent light-emitting action are hindered.

As for the other pigment components, those having various types of color tones may be usable. For use in the lane marking and the like, as representative examples, a white pigment, a yellow pigment, an orange pigment and a red pigment are illustrated. As for the white pigment, for example, a zirconium oxide-type pigment, a titanium oxide-type pigment, an aluminum hydroxide-type pigment and the like are illustrated. Among other things, the white pigment comprising any one of oxides or complex oxides such as zirconia (zirconium oxide), zircon (zirconium silicate) and the like is preferable from the standpoint of a photoluminescence effect derived from a smaller concealment of light than other pigments.

As for the yellow pigment, for example, chrome yellow, cadmium yellow, nickel titanium yellow and the like are illustrated. As for the orange or red pigment, colcothar, cadmium red, molybdenum red and the like are illustrated. Various types of pigments having other colors than the above-described colors, such as blue, green, black and others may of course be considered. In regard to these pigment components, they may be used either individually or in any combinations thereof.

When any one of the above-described oxides or complex oxides of zirconium is compounded as a white pigment, a quantity thereof is preferably in a range of from 0.1% by weight to 5.0% by weight based on the entire weight of the resin paste.

As for the other pigment components, it is preferable that an average particle size thereof is ordinarily in a range of from 0.1 μm to 40 μm. This is because that, when the average particle diameter is more than 40 μm, there are some cases in which the photoluminescence pigment component is liable to be concealed by these pigment components.

It goes without saying that an organic pigment can optionally be compounded either together with any one of the inorganic pigments or alone. Further, according to the invention, a transparent aggregate, for example, silica rock, glass, crystalline quartz or the like may be mixed.

The transparent aggregate is effective not only for imparting a cured body as a road marking material with a physical performance such as a required strength or an wear resistance but also for performing a role of magnifying a photoluminescence operation of the photoluminescence pigment by allowing light to pass through a particle thereof or to be subjected to a diffused reflection on a surface boundary thereof, due to transparency of the transparent aggregate. What's more, compounding the transparent aggregate, as described later, contributes to enhance not only a photoluminescence function by applying the resin paste to a surface of the road, curing the thus-applied resin paste and subsequently subjecting the thus-cured resin paste to rough polishing or a surface roughening treatment by a water-jet treatment but also a non-slip performance as the road marking material.

For such transparent aggregates, particularly the silica rock and glass are preferable whereupon they may be used either individually or in combination. A particle diameter thereof is preferably in a range of from 0.3 mm to 10 mm and a quantity thereof to be compounded is preferably in a range of from 0.1 time by weight to 6 times by weight as much as the entire weight of the resin paste.

When the particle diameter is less than 0.3 mm or such compounding is less than 0.1 time by weight, an addition effect thereof can not be much expected. When the particle diameter is more than 10 mm or the compounding is more than 6 times by weight, strength and the like of a molded body is liable to be deteriorated; this situation is not favorable.

Other than these transparent aggregates, inorganic fillers maybe compounded. A particle diameter thereof is less than 0.1 mm and examples of the inorganic fillers include fused silica powders, quartz (silica rock) powders, calcium carbonate, aluminum hydroxide, plastic powders, glass powders and the like.

In the photoluminescence road marking material according to the invention, for example, the transparent resin component as described above is mixed with the photoluminescence pigment component or a component comprising the photoluminescence pigment component and at least one member selected from the group consisting of the other pigment components and the transparent aggregates to prepare the resin paste.

On this occasion, such preparation by mixing is an extremely important requirement. Among other things, using the photoluminescence pigment having a relatively large particle diameter and the transparent resin component having a high viscosity as a matrix for uniformly dispersing such photoluminescence pigment is particularly important.

Emphatically speaking, first of all, for the above-described preparation prepared according to the invention, a method comprising setting a content ratio of air bubbles to a unit volume of the resin paste to be 2% or less is provided.

At the time of preparation by mixing, stirring is ordinarily conducted whereupon a stirring condition is to be set such that the content ratio of the air bubbles comes to be 2% or less. Thus, selection of a stirring device, the number of revolutions thereof at the time of stirring, an atmosphere at the time of stirring and the like are controlled.

As mixing by stirring goes on, air bubbles are generated. Then, there is caused a problem in which the pigment component having a relatively smaller particle diameter or a smaller specific gravity than the photoluminescence pigment component rises to a surface of a preparation prepared by mixing at the time of molding the preparation along with remaining air bubbles to thereby tend to conceal the photoluminescence pigment component. When the content ratio of the air bubbles to a unit volume of such preparation prepared by mixing is sometimes more than 2%, a trouble to be derived from such concealment can not be neglected.

In order to control the content ratio of the air bubbles, it is effective to prepare by mixing under a pressure reduced from a normal pressure by 50 kPa or more. By conducting mixing in an atmosphere of a reduced pressure, remaining of the air bubbles can effectively be suppressed. When a rate of such pressure reduction is small, an effect to be derived from such pressure reduction is not sufficiently exhibited.

Further, the content ratio of the air bubbles can be measured by measuring a ratio of volume reduction of the preparation to be generated when an inside of a vessel is filled with the preparation and, then, an atmosphere is reduced by 100 kPa from a normal pressure.

Furthermore, in order to enhance the photoluminescence performance, it is also effective to suppress a contamination (mixture of foreign matter) at the time of the preparation by mixing. Particularly, it is preferable that the mixture of the foreign matter such as metal from the stirring device is suppressed as much as possible.

For this end, it is effective to arrange a surface hardness of an inner surface of a mixing vessel or a stirring blade constituting a mixing apparatus to be higher than the hardness of the pigment or transparent aggregate. As a convenient method, it is effective to use the mixing vessel with the inner surface or the stirring blade covered with a transparent or white covering material. By performing such arrangement, even when a small quantity of the foreign matter is mixed, the photoluminescence performance is scarcely or not at all influenced.

Examples of transparent or white covering materials include a laminate of an a lumina fuse-deposited film or a ceramic plate, glass, silicone rubber, a silicone resin, a fluorocarbon resin, an MMA-type resin and the like.

The resin paste prepared by mixing in a manner as described above is applied on the surface of the road by an appropriate method and, then, cured. Accordingly, the road marking material having a predetermined shape in which the photoluminescence layer is formed and a road structure which is integrated with the road marking material after it is applied thereon are realized.

In relation to an application on the surface of the road and subsequent curing on site, a certain number of important proposals are made according to the invention.

A first proposal is, as described above, that the resin paste is mixed with the transparent aggregate and, then, the resultant resin paste is applied on the surface of the road, cured and, thereafter, a surface layer part of the resultant cured body is subjected to rough polishing or a water-jet treatment.

As described above, as the resin paste is applied, the pigment component having a small particle diameter other than the photoluminescence pigment rises to the surface part of the resin paste and, accordingly, comes to be unevenly distributed to thereby sometimes conceal the light transmission or light-emission for the phosphorescence. When such phenomenon can not be neglected, it is effective that the surface of the cured body is subjected to rough polishing or a water-jet treatment to remove a concealing layer (part).

In other words, for example, as a cross-section is schematically shown in FIG. 1, the transparent aggregate is previously compounded to the resin paste and, after the resultant resin paste is applied on the surface of the road (1) and cured, the surface of the photoluminescence layer (2) containing the transparent aggregate (3) is subjected to rough polishing (A) or a water-jet treatment (B) to partially remove only a surface cured part of the resin paste.

After the resin paste is applied, a concealing property thereof, that is, a light shielding property thereof is large and, further, the pigment component having a small particle diameter is likely to be accumulated on the surface part thereof. A concealing layer (4) formed by accumulating such pigment component deteriorates the photoluminescence performance, since the transmission of light is shielded. The rough polishing or the water-jet treatment is effective in enhancing the photoluminescence performance by removing the concealing layer (4).

In either case of the water-jet treatment and the rough polishing, in order to remove the concealing layer (4), it is preferable that a range of from 0.1 mm to 2 mm in a thickness direction removes the surface cured part of the resin paste.

Further, as for a device for performing the rough polishing, various types of devices utilizing rotational polishing and the like by a disk provided with diamond may be adopted.

Forming an irregular surface by a surface part treatment and, particularly, the water-jet treatment as described above will effectively impart the photoluminescence road marking material according to the invention with the non-slip performance.

Figure 2:
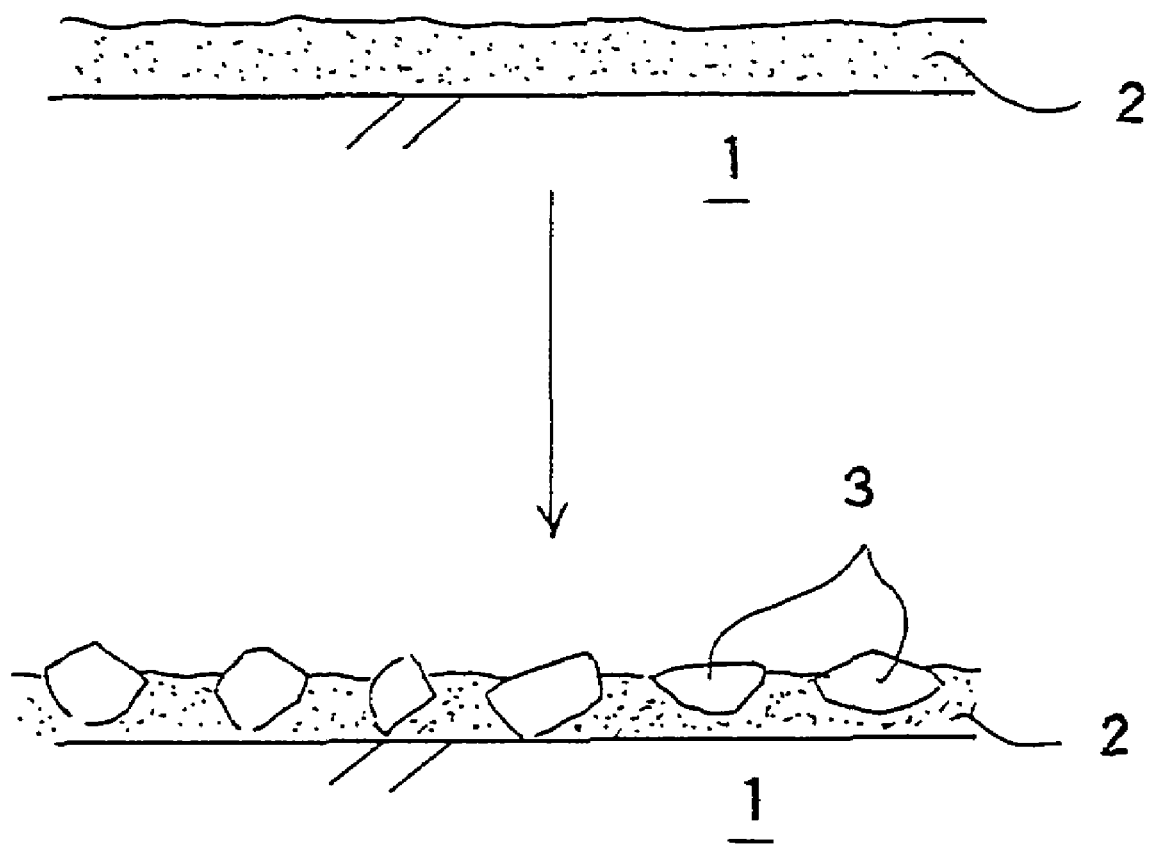
FIG. 2 is a cross-sectional view illustrating a series of embedding operations of transparent aggregates.

Furthermore, according to the invention, the same enhancement of the photoluminescence performance and the non-slip performance as in the case in which the transparent aggregate is previously compounded in the resin paste can be realized by first applying the resin paste on a road base and, then, scattering the transparent aggregate on the thus-applied resin paste and, thereafter, embedding the transparent aggregate in the photoluminescence layer in a state in which at least a part of a contour thereof is exposed. Namely, for example, as a partial cross-section thereof is schematically shown in FIG. 2, the scattered transparent aggregate (3) is embedded in the photoluminescence layer (2) which has been formed by curing the resin paste after it was applied on the road base (1) whereupon at least a part of a contour thereof is exposed outside from the surface of the photoluminescence layer (2).

The transparent aggregate on this occasion is in a natural stone-like shape and a contour thereof is by far larger than that of the photoluminescence pigment which is compounded to the resin paste. The transparent aggregate is also large in both strength and hardness and is silica rock, fused silica, glass or the like which each have a so-called aggregate property.

Practically, it is preferably considered from the standpoint of physical properties such as strength and peeling resistance generated by being adhered to and integrated with the photoluminescence layer (2), an incremental effect (as compared with a case in which the transparent aggregate is not scattered) of the photoluminescence performance and the like that 50% by volume or more of the contour of these silica rock, fused silica and glass is embedded in the photoluminescence layer (2) or from 0.1 mm to 5 mm thereof in height is exposed outside the surface of the photoluminescence layer (2). Further, it is considered that the particle diameter is preferably in a range of from 0.3 mm to 10 mm, and more preferably in a range of from 2.0 mm to 3.0 mm.

It is considered that a quantity of the transparent aggregate to be scattered is in a range of from 1 kg/cm$^2$ to 30 kg/cm$^2$, and preferably in a range of from 3 kg/cm$^2$ to 10 kg/cm$^2$.

Further, as for thickness of the photoluminescence layer (2), although it is not particularly limited, but it is considered that the thickness is in a range of from 1 mm to 5 mm.

As for the practical application, after the resin paste is applied on the road base (1), the transparent aggregate (3) is scattered on the thus-applied resin paste while the resin paste is still in a state of holding flow ability or being half cured and, then, the thus-scattered transparent aggregate is allowed to be partially embedded in the resin paste by an own weight thereof and optionally by a further weight to be applied by a roller or the like thereon and, thereafter, the resin paste is cured to allow the transparent aggregate (3) to be embedded in the photoluminescence layer (2) in a state of being integrated therewith.

By being characteristically configured as described above, the marking material according to the invention remarkably enhances the photoluminescence effect as compared with a case in which the transparent aggregate is not used. It is considered that this is attributable to a great extent to the fact that a surface area on which light to be used for absorbing light energy emitted from sunlight or a fluorescent lamp is incident is increased in the presence of the transparent aggregate.

Further, due to the presence of the transparent aggregate, which exposes itself outward, an irregular contour is formed on a surface part of the marking material after being applied and such contour enhances a non-slip performance of the surface part thereof. This non-slip performance is extremely important from the standpoint that, depending on a type of the marking material on a surface of a pedestrian crosswalk or a road with a pedestrian passageway, a human individual is prevented from being slipped or getting a traffic accident to be caused by such slipping and the like.

It is important also from the standpoint of enhancement of the non-slip performance to define a size, a quantity to be scattered, a ratio and height of exposure of the transparent aggregate as described in the above according to the invention.

Further, according to the invention, in order to allow the photoluminescence effect to be greater, it is also effective to provide an undercoat layer of white color on a required position before the resin paste is applied. Such white undercoat layer may comprise not only a known material but also various types of other materials.

Needless to say, according to the invention, in order to enhance an adhesion strength in accordance with not only the white undercoat layer but also a state and properties of the surface part of the road made of concrete, asphalt or the like and further a type, properties and the like of the transparent resin, a primer layer-may-previously be provided and, then, the road marking material according to the invention provided thereon and integrated therewith.

The primer layer may be considered as main purpose of sealing surface of road or increasing adhesion strength. As forming the primer layer, known materials, such as urethane resin, epoxy resin and asphalt series material can be used. The transparent resin component or similar one composed in photoluminescence road marking material of the present invention can also be used. In case of using the transparent resin component or similar one, adhesion performance between high-emitting road marking layer a supper layer and road surface can be increased, because of using same or similar component.

As described above, according to the invention, provided is the photoluminescence road marking material which is useful as the lane marking and the like of the road, has a high photoluminescence performance and can be used for a white line or a color line of, for example, yellow, orange and any other appropriate color by suppressing a green color tone regardless of concurrently using a photoluminescence pigment.

Now, the following embodiments are given to further illustrate the invention and should not be interpreted as limiting the invention in any way.

Further, evaluation of the photoluminescence performance in the following embodiments is conducted in conformity to JIS "Phosphorescent Safety Sign Boards" Z9100-1987 such that, after irradiation is performed by a D65 standard light source at 200 Lx (lux) until a saturation state is attained, a time period until brightness reaches 3 mcd/m$^2$ is defined as an evaluation reference.

EXAMPLES

Example 1

Various types of MMA resin syrups, in which an MMA polymer and an MMA monomer are present in a mixed state, differing in content ratios of the MMA polymer and viscosities from one another were prepared and, then, a photoluminescence component and other components were mixed to each of the MMA resin syrups to obtain a following compounding ratio (by weight):

| | |
|---|---|
| MMA resin syrup | 35.5 |
| Resin curing agent | 0.5 |
| Strontium aluminate-type photoluminescence pigment (available from Nemoto & Co., Ltd.; average particle diameter: 100 μm) | 52.0 |
| Aluminum hydroxide (average particle diameter: 8 μm) | 12.0 |

Mixing was performed under a reduced pressure of 0.1 atm. At that time, a content ratio of air bubbles to a unit volume of the resultant preparation prepared by mixing was allowed to be 1% or less.

The preparation prepared by mixing was applied on a surface of a concrete sample having the same structure as that of a surface of a road and, then, cured.

Adhesion strength to the surface of the sample of a mold-cured body was 150 N/cm$^2$ (concrete base fracture) and the wear resistance was 0.02 g (in conformity to JIS A 1452) at the viscosity ranging from 1.0 Pa.s to 10.0 Pa.s (20° C.); the results were favorable.

Further, in regard to the mold-cured body, a time period until the brightness reached 3 mcd/m$^2$ was measured to evaluate the photoluminescence performance. The results are shown in Table 2.

TABLE 2

| MMA resin syrup viscosity Pa · s (20° C.) | Time until reaching 3 mcd/m$^2$ (Hr) |
|---|---|
| 0.5 | 3 |
| 1.0 | 8 |
| 1.5 | 9 |
| 2.0 | 10 |
| 6.0 | 13 |
| 10.0 | 13 |

From Table 2, it is found that, when the viscosity of the resin syrup was less than 1.0 Pa.s (20° C.), it was difficult for the time period until reaching 0.3 mcd/m$^2$ to be more than 8 hours. On the other hand, it is found that, when the viscosity of the resin syrup was more than 1.0 Pa.s (20° C.), the time period until reaching 3 mcd/m$^2$ was more than 8 hours and, further, more than 14 hours.

Example 2

A mold-cured body was obtained in the same manner as in Example 1 except that MMA resin syrup having a viscosity of 6.0 Pa.s (20° C.) was used and the strontium aluminate-type photoluminescence pigments having different average particle diameters were used. In either case, adhesion strength to the surface of the sample was from 100

N/cm² to 160 N/cm² (concrete base fracture) and wear resistance was from 0.01 g to 0.02 g (in conformity to JIS A 1452).

For each sample, a time period until reaching 3 mcd/m² was measured. The results are shown in Table 3.

TABLE 3

| Average particle diameter (μm) | Time until reaching 3 mcd/m² (Hr) |
|---|---|
| 5 | 3 |
| 10 | 8 |
| 30 | 9 |
| 50 | 11 |
| 100 | 14 |
| 150 | 18 |
| 300 | 22 |

It was confirmed that a remarkable enhancement of the photoluminescence performance was realized by using a photoluminescence pigment component having a large particle diameter. On the other hand, it was also confirmed that, when the particle diameter of the photoluminescence pigment component was less than 10 μm, a time period until reaching 3 mcd/m² was not more than 8 hours.

Example 3

Stir-mixing was conducted in the same manner as in Example 1 except that an MMA resin syrup having a viscosity of 6.0 Pa.s (20° C.) was used, an atmosphere at the time of mixing was changed and a mixing apparatus was changed.

For each case, a time period until reaching 3 mcd/m² was measured. The results are shown in Table 4. In Table 4, a rate of pressure reduction (kPa) denotes that of pressure reduced from a normal pressure.

Further, mixing apparatuses A, B and C has the following features:

A: Both the inside of the mixing vessel and the stirring blade are made of stainless steel;

B: Same as in A except that a surface of the stirring blade is covered with silicone rubber; and C: Same as in A except that both the inside of the mixing vessel and the surface of the stirring blade are covered with silicone rubber.

TABLE 4

| Rate of pressure reduction (kPa) | Mixing apparatus | Time until reaching 3 mcd/m² (Hr) |
|---|---|---|
| 90 | A | 13 |
| 80 | A | 13 |
| 60 | A | 13 |
| 50 | A | 8 |
| 30 | A | 7 |
| 50 | B | 10 |
| 60 | B | 15 |
| 80 | C | 18 |

It was confirmed that it is effective to reduce the pressure by 5 kPa or more and, also, covering the inside of the mixing apparatus and the surface of the stirring blade with silicone rubber gives a favorable performance.

Example 4

An MMA resin syrup in which an MMA polymer and an MMA monomer are present in a mixed state (viscosity: 6.0 Pa.s (20° C.)) was prepared and, then, a photoluminescence pigment component and other components were mixed thereto to obtain a following compounding ratio (by weight):

| MMA resin syrup | 35.5 |
|---|---|
| Resin curing agent | 0.5 |
| Strontium aluminate-type photoluminescence pigment (available from Nemoto & Co., Ltd.; average particle diameter: 150 μm) | 54.0 |
| Other pigments (average particle diameter: 30 μm) | 10.0 |

Mold-cured bodies using various types of pigments were manufactured in the same manner as in Example 1, and respective time periods until reaching 3 mcd/m² were measured. The results are shown in Table 5.

TABLE 5

| Other pigments | Time until reaching 3 mcd/m² (Hr) |
|---|---|
| Titanium oxide | 8 |
| Aluminum hydroxide | 15 |
| Titanium oxide (50) Aluminum hydroxide (50) | 10 |
| Zircon | 18 |
| Zircon (50) Aluminum hydroxide (50) | 17 |

It is found that, since zircon has a small concealing ability as a white pigment, zircon is excellent in photoluminescence performance.

Example 5

In Example 4, aluminum hydroxide was used for the other components and, further, the compounding ratio of the photoluminescence pigment (A) to the aluminum hydroxide (B) was changed. Under these circumstances, respective time periods until reaching 3 mcd/m² were measured. The results are shown in Table 6.

TABLE 6

| Weight ratio (B/A) | Time until reaching 3 mcd/m² (Hr) |
|---|---|
| 0.150 | 15 |
| 0.185 | 15 |
| 1.05 | 14 |
| 2.25 | 9 |
| 3.54 | 6 |

It was confirmed that, when the weight ratio B/A is more than 3, the photoluminescence performance has rapidly been decreased.

Example 6

In Example 4, aluminum hydroxide was used for the other components and, further compounding ratios of respective components were changed. Under these circumstances, respective time periods until reaching 3 mcd/m² were measured. The results are shown in Table 7.

TABLE 7

| MMA resin syrup | Photoluminescence pigment | Aluminum hydroxide | Time until reaching 3 mcd/m² (Hr) |
|---|---|---|---|
| 15.2 | 54.0 | 30.0 | 14 |
| 22.5 | 43.0 | 20.0 | 15 |
| 35.5 | 54.0 | 10.0 | 15 |
| 58.6 | 35.0 | 5.4 | 10 |
| 86.4 | 10.0 | 3.0 | 8 |
| 96.0 | 3.5 | 0 | 3 |

Example 7

In Example 4, aluminum hydroxide was used for the other components and, further a compounding ratio of strontium aluminate-type photoluminescence pigment was set to be 24.0 and silica rock powders having an average particle diameter as a transparent aggregate was compounded at a rate of 30.0.

The time until reaching 3 mcd/m² of the resultant preparation was relatively favorable as being about 8 hours, although a quantity of the photoluminescence pigment compounded was substantially decreased.

The weight ratio of the transparent component (C) to the aggregate (D) thereof was 0.845 at this time. When this weight ratio was changed into 3.0, the time period until reaching 3 mcd/m² became 9 hours.

Example 8

In Example 4 of the case in which aluminum hydroxide was used for other pigments, a mold-cured body was obtained by using a silicone resin ("KE1310S"; available from Shin-Etsu Chemical Co., Ltd.) in place of the MMA resin syrup. The viscosity was about 50 Pa.s (20° C.).

The time until reaching 3 mcd/m² was 14 hours. Therefore, it was confirmed that a favorable photoluminescence performance can be obtained.

Example 9

In Example 7, after a resin paste having a weight ratio D/C=3 was applied, a surface of the cured body having a thickness of 3 mm was subjected to water-jet injection whereupon a part having a thickness of about 0.5 mm of the surface cured part was removed to allow the surface to be roughened.

Slipping resistance BPN (ASTM E303) of such roughened surface was 65 on a wet surface and 70 on a dry surface whereupon it was confirmed that the non-slip performance is excellent. It was also confirmed that the time period until reaching 3 mcd/m² is extended from 9 hours measured before the treatment to 10 hours.

Example 10

In Example 4, after a resin paste in which aluminum hydroxide used for other pigments was applied in a thickness of 4 mm, before it was cured, glass powders having a particle diameter of from 1 mm to 5 mm were scattered thereon at a rate of 5 kg/m², and cured in a state in which about 55% by volume of each powder was embedded and each powder was protruded outward by a range of from 0.1 mm to 1.4 mm in height.

Slipping resistance BPN (ASTM E303) of the surface of such cured body was 66 on a wet surface and 69 on a dry surface whereupon it was confirmed that the non-slip performance is excellent. It was also confirmed that the time period until reaching 3 mcd/m² is extended to 17 hours.

Example 11

In Example 1, the resin paste of a case of 6.0 Pa.s (20° C.) was used. After white color tone paint for use in a road was previously applied (thickness: 2 mm) on a surface of sample asphalt as an undercoat layer, the resin paste was applied on the undercoat layer and, then, cured.

The time period until reaching 3 mcd/m² and an initial brightness after 15 minutes were measured. The results are illustratively shown in Table 8. It was found that the photoluminescence performance was remarkably enhanced by the presence of the white undercoat layer.

TABLE 8

| Color of undercoat layer | Time until reaching 3 mcd/m² (Hr) | Initial brightness (3 mcd/m²) |
|---|---|---|
| White | 18 | 482 |
| Silver | 16 | 355 |
| Asphalt surface | 13 | 205 |

Comparative Example 1

A mold was prepared in accordance with disclosure of JP-A-10-82023. The photoluminescence performance thereof was measured. Even as an optimal result, it was showed that the time until reaching 3 mcd/m² was 5 hours and 15 minutes. Further, a light-emitting color was strong in the color (green) of the phosphorescent pigment.

Comparative Example 2

According to Example 1, resin paste having a viscosity of 6.0 Pa.s (20° C.) and amount ratio of 28.5 was used for coating a surface of concrete pavement sample at the condition of thickness of 2 mm.

Adhesion strength in each case of sealer coated and sealer not coated was evaluated by the measuring method of immersion in hot water (60° C.). Results are shown in Table 9.

Table 2 shows that enough adhesion strength is realized in the case of sealer not coated and that coating sealer increases adhesion strength.

TABLE 9

| Sealer | Adhesion strength after 1 week (N/cm²) | Adhesion strength after 2 weeks (N/cm²) |
|---|---|---|
| None | 142 | 134 |
| Urethane sealer | 359 | 340 |
| MMA resin sealer | 265 | 260 |

(MMA sealer contains mainly same resin component of the resin paste)

Example 13

Experiment similar to Example 12 was carried out toward surface of asphalt pavement.

Sealer for forming primer layer was not used.

As the result, each adhesion strength after 1 week and 2 weeks is 332 N/cm² and 330 N/cm².

As described above in detail, according to the present invention, provided is a novel photoluminescence road marking material which is useful for a marking of a lane of a road and the like, has a required wear resistance or weather resistance as well as a high photoluminescence performance and can find an application in a white line or various types of color lines by suppressing a green color tone and can be imparted with a non-slip performance.

What is claimed is:

1. A photoluminescence road marking material, which comprises a resin paste to be applied on a surface of a road to form a photoluminescence layer,
    wherein the resin paste comprises a transparent resin component, a photoluminescence pigment component and optionally an auxiliary material selected from the group consisting of other pigment components, curing catalysts, curing auxiliary agents, viscosity adjusting agents, ultraviolet ray deterioration preventive agents and anti-fungus agents,
    wherein the resin paste is compounded with from 7% by weight to 95% by weight of the transparent resin component based on the entire weight of the resin paste,
    wherein a viscosity of the transparent resin component is 3 Pa•s (20° C.) or more, and
    wherein an average particle diameter of the photoluminescence pigment component is 150 μm or larger.

2. The photoluminescence road marking material as set forth in claim 1, wherein the average particle diameter of the photoluminescence pigment component is in a range of from 150 μm to 2000 μm.

3. The photoluminescence road marking material as set forth in claim 1, wherein an average particle diameter of the other pigment components is in a range of from 0.1 μm to 40 μm.

4. The photoluminescence road marking material as set forth in claim 1, wherein the other pigment components are at least one pigment selected from the group consisting of a white pigment, a yellow pigment, an orange pigment and a red pigment.

5. The photoluminescence road marking material as set forth in claim 1, wherein a compound ratio by weight (B/A) of the photoluminescence pigment component (A) to the other pigment components (B) is 3.0 or less.

6. The photoluminescence road marking material as set forth in claim 4, wherein an oxide or a complex oxide of zirconium is compounded as a white pigment component.

7. The photoluminescence road marking material as set forth in claim 6, wherein compounding of the oxide or complex oxide of zirconium to the resin paste is in a range of from 0.1% by weight to 5.0% by weight based on the entire weight of the resin paste.

8. The photoluminescence road marking material as set forth in claim 1, wherein a content ratio of air bubbles per unit volume of the resin paste is 2% or less.

9. A photoluminescence road structure comprising the road marking material as set forth in claim 1 on a surface of a road.

10. The photoluminescence road structure as set forth in claim 9, further comprising a white undercoat layer between the road marking material and the surface of the road.

11. The photo luminescence road structure as set forth in claim 9, further comprising a primer layer.

12. A method of marking a road, which comprises applying the photoluminescence road marking material as set forth in claim 1 on a road surface.

13. The method of marking a road as set forth in claim 12, further comprising subjecting the road surface to a surface roughening treatment and then applying a white undercoat layer on the road surface, prior to applying the photoluminescence road marking material.

14. The method of marking a road as set forth in claim 12, wherein the road marking material is applied via a primer layer.

15. The method of marking a road as set forth in claim 12, comprising applying the resin paste which consists of a transparent resin component, a photoluminescence pigment component and optionally an auxiliary material, scattering a transparent aggregate on the thus-applied resin paste, and curing the thus-applied resin paste.

16. The method of marking a road as set forth in claim 12, further comprising curing the resin paste, subjecting the thus-cured resin paste to rough polishing or a water-jet treatment to remove a cured surface part of the resin paste.

17. The method of marking a road as set forth in claim 16, wherein the cured surface part of the resin paste is removed by a range of from 0.1 mm to 2 mm in a thickness direction from the surface thereof.

18. The photoluminescence road structure as set forth in claim 10, further comprising a primer layer.

19. A photoluminescence road marking material, which comprises a resin paste to be applied on a surface of a road to form a photoluminescence layer,
    wherein the resin paste comprises a transparent resin component, a photoluminescence pigment component, a transparent aggregate, and optionally an auxiliary material selected from the group consisting of other pigment components, curing catalysts, curing auxiliary agents, viscosity adjusting agents, ultraviolet ray deterioration preventive agents and anti-fungus agents, or
    the resin paste comprises a transparent resin component, a photoluminescence pigment component, and optionally an auxiliary material selected from the group consisting of other pigment components, curing catalysts, curing auxiliary agents, viscosity adjusting agents, ultraviolet ray deterioration preventive agents and anti-fungus agents, wherein a transparent aggregate is embedded in the photoluminescence layer,
    wherein the resin paste is compounded with from 7% by weight to 95% by weight of the transparent resin component based on the entire weight of the resin paste,
    wherein a viscosity of the transparent resin component is 3 Pa.s (20° C. ) or more, and
    wherein an average particle diameter on the photoluminescence pigment component is 150 μm or larger.

20. The photoluminescence road marking material as set forth in claim 19, wherein the transparent aggregate is at least one member selected from the group consisting of silica rock, fused silica and glass.

21. The photoluminescence road marking material as set forth in claim 19, wherein an average particle diameter of the other pigment components is in a range of from 0.1 μm to 50 μm.

22. The photoluminescence road marking material as set forth in claim 19, wherein the other pigment components are at least one pigment selected from the group consisting of a white pigment, a yellow pigment, an orange pigment and a red pigment.

23. The photoluminescence road marking material as set forth in claim 19, wherein a compound ratio by weight (B/A) of the photoluminescence pigment component (A) to the other pigment components (B) is 3.0 or less.

24. The photoluminescence road marking material as set forth in claim 22, wherein an oxide or a complex oxide of zirconium is compounded as a white pigment component.

25. The photoluminescence road marking material as set forth in claim 24, wherein compounding of the oxide or complex oxide of zirconium to the resin paste is in a range of from 0.1% by weight to 5.0% by weight based on the entire weight of the resin paste.

26. The photoluminescence road marking material as set forth in claim 19, wherein a content ratio of air bubbles per unit volume of the resin paste is 2% or less.

27. A photoluminescence road structure comprising the road marking material as set forth in claim 19 on a surface of a road,
wherein 50% by volume or more of the transparent aggregate is embedded and at least one part of a contour of the transparent aggregate is exposed in a range of from 0.05 mm to 5 mm from a surface of the photoluminescence layer.

28. The photo luminescence road structure as set forth in claim 27, wherein thickness of the resin paste is in a range of from 1 mm to 5 mm.

29. The photoluminescence road structure as set forth in claim 27, wherein the road marking material is a cured and treated road marking material, with enhanced photoluminescence performance.

30. The photoluminescence road structure as set forth in claim 27, further comprising a white undercoat layer between the road marking material and the surface of the road.

31. The photoluminescence road structure as set forth in claim 27, further comprising a primer layer.

32. The photoluminescence road structure as set forth in claim 30, further comprising a primer layer.

33. A method of marking a road, which comprises applying the photoluminescence road marking material as set forth in claim 19 on a road surface.

34. The method of marking a road as set forth in claim 33, further comprising subjecting the road surface to a surface roughening treatment and then applying a white undercoat layer on the road surface, prior to applying the photoluminescence road marking material.

35. The method of marking a road as set forth in claim 33, wherein the road marking material is applied via a primer layer.

36. The method of marking a road as set forth in claim 33, comprising applying the resin paste which consists of a transparent resin component, a photoluminescence pigment component and optionally an auxiliary material, scattering a transparent aggregate on the thus-applied resin paste, and curing the thus-applied resin paste.

37. The method of marking a road as set forth in claim 33, further comprising curing the resin paste, subjecting the thus-cured resin paste to rough polishing or a water-jet treatment to remove a cured surface part of the resin paste.

38. The method of marking a road as set forth in claim 37, wherein the cured surface part of the resin paste is removed by a range of from 0.1 mm to 2 mm in a thickness direction from the surface thereof.

* * * * *